United States Patent [19]

Isayama et al.

[11] 3,951,888

[45] Apr. 20, 1976

[54] PROCESS FOR PREPARING POLYOXYALKYLENE HAVING ALLYL END-GROUP

[75] Inventors: Katsuhiko Isayama; Itaru Hatano, both of Kobe, Japan

[73] Assignee: Kanegafuchi Kagaku Kogyo Kabushiki Kaisha, Osaka, Japan

[22] Filed: June 7, 1974

[21] Appl. No.: 477,409

[30] Foreign Application Priority Data
June 7, 1973 Japan.............................. 48-64567
May 21, 1974 Japan.............................. 49-57604

[52] U.S. Cl.................................. 260/823; 260/79; 260/615 B; 526/49; 526/393
[51] Int. Cl.$^2$........................................... C08G 65/32
[58] Field of Search......................... 260/615 B, 2 A

[56] References Cited
UNITED STATES PATENTS

| | | | |
|---|---|---|---|
| 2,425,755 | 8/1947 | Roberts et al. | 260/615 |
| 2,520,611 | 8/1950 | Roberts et al. | 260/615 |
| 2,520,612 | 8/1950 | Roberts et al. | 260/615 |
| 2,662,859 | 12/1953 | Kirkpatrick | 252/231 |
| 2,706,207 | 4/1955 | Schnell et al. | 260/615 |
| 2,841,621 | 7/1958 | Riley | 260/615 |
| 2,923,690 | 2/1960 | Bedoit | 260/2 |

*Primary Examiner*—Donald E. Czaja
*Assistant Examiner*—E. A. Nielsen
*Attorney, Agent, or Firm*—Armstrong, Nikaido & Wegner

[57] ABSTRACT

A process for preparing a polyalkylene oxide having allyl end-group, by subjecting an alkylene oxide monomer to addition polymerization in the presence of potassium hydroxide in an amount of 2 to 30% by mole to the monomer at a temperature of 20° to 100°C., and reacting the polymerized alkylene oxide with an allyl halide compound, or by subjecting the monomer to addition polymerization in the presence of potassium hydroxide, reacting the polymerized alkylene oxide with an organic polyhalide and then reacting with an allyl halide compound. Potassium hydroxide is preferably employed in combination with the specific initiator. There can be prepared polyalkylene oxide of which all of the chain ends are substantially allyl group.

23 Claims, No Drawings

PROCESS FOR PREPARING POLYOXYALKYLENE HAVING ALLYL END-GROUP

BACKGROUND OF THE INVENTION

The present invention relates to a novel process for preparing a polyalkylene oxide having allyl end-groups, more particularly to a process for cheaply and easily preparing the polyalkylene oxide having a comparatively high molecular weight.

There have been proposed various processes for preparing polyalkylene oxides of which all of the chain ends are hydroxyl group, and polyalkylene oxides of which one end-group is olefin group and another end-group is saturated alkyl group.

Also, processes for preparing polyalkylene oxides having olefin group of allyl type in all of the chain ends are disclosed in U.S. Pat. No. 3,408,321 to Bruce A. Ashby et al and U.S. Pat. No. 3,592,795 to Bruce A. Ashby et al. The polyalkylene oxide disclosed in U.S. Pat. No. 3,592,795 is prepared by reacting hydroxyl end-groups of polyalkylene oxide with allyl isocyanate, and the polyalkylene oxide disclosed in U.S. Pat. No. 3,408,321 is prepared by reacting hydroxyl end-groups of polyoxyalkylene with a polyfunctional isocyanate compound such as toluene diisocyanate to give a polyalkylene oxide having an isocyanate end-groups and further reacting the isocyanate end-group with allyl alcohol. The allyl end-group in these polymers is bonded to the polyalkylene oxide chain through a urethane bonding. In either case, polyalkylene oxide having hydroxyl end-groups is employed as a starting material, and the reaction between hydroxyl group and isocyanate group is applied. However, as is well known, isocyanate group is very active to water and an isocyanate compound generates carbon dioxide gas or causes a side reaction in the presence of water. Therefore, in such processes employing polyalkylene oxide having hydroxyl end-groups as a starting material, the polyalkylene oxide must be substantially dehydrated and purified and therefore expensive. Also, an isocyanate compound is an expensive starting material by itself and must be carefully handled since isocyanate group is a toxic functional group and harms a skin in contact therewith. Thus, the processes according to U.S. Pat. Nos. 3,408,321 and 3,592,795 have the disadvantages that the obtained polymer is expensive due to employing expensive starting materials and there must be taken attention in preparation since preparing steps and procedures are complicate.

There has been well known an industrial process for preparing polyalkylene oxide having hydroxyl end-groups by subjecting an alkylene oxide monomer to addition polymerization with employing potassium hydroxide as a catalyst. In this process, the polymerization is commonly carried out under a catalytic concentration of 0.3 to 1.0 % by mole of potassium hydroxide to the monomer and at high temperature, as 100° to 160°C. It is well known fact that the potassium hydroxide being a catalyst is for the most part bonded to the chain-end of the produced polyalkylene oxide in a form of alkoxide (~OK) in the polymer solution so obtained. It is possible to introduce allyl group to the chain-end by reacting this alkoxide end-group with a an allyl halide compound, but very difficult to introduce it to all of the chain ends. The polymerization of alkylene oxide by potassium hydroxide is not a complete living polymerization and large amount of polyalkylene oxide having hydroxyl end-group is by-produced due to the chain transfer reaction during the polymerization. Therefore, it is impossible to prepare polyalkylene oxide having allyl end-groups in all of the chain ends merely by treating such a polymer solution prepared under a usual polymerization condition with an allyl halide comound. Even in the best case, the allyl end-group is at most 60 % by mole of the total end-groups. That is to say, it is the present state that the direct preparation of polyalkylene oxide of which all of the chain ends are allyl group by an addition polymerization of alkylene oxide monomer is difficult.

OBJECTS OF THE INVENTION

It is an object of the present invention to provide a novel process for preparing a polyalkylene oxide having allyl end-groups.

A further object of the invention is to provide a process for preparing a polyalkylene oxide having allyl end-groups cheaply and easily.

A still further object of the invention is to provide a process for preparing a polyalkylene oxide having allyl end-groups by subjecting an alkylene oxide monomer to an addition polymerization without employing an expensive isocyanate compound and a polyalkylene oxide having hydroxyl end-groups as starting materials.

Another object of the invention is to provide a process for preparing a polyalkylene oxide of which all of the chain ends are substantially allyl group and having a comparatively high molecular weight.

These and other objects of the invention will become apparent from the description hereinafter.

DETAILED DESCRIPTION

The present invention is based on the fact that the following equilibrium relation is established between an alcohol and potassium hydroxide:

$$ROH + KOH \rightleftharpoons ROK + H_2O$$

and has been accomplished by employing potassium hydroxide not only as a polymerization catalyst for an alkylene oxide monomer but also as an agent capable of converting a hydroxyl end-group formed by chain transfer reaction into an alkoxide group (~OK).

The polyalkylene oxide having allyl end-groups is prepared by subjecting an alkylene oxide monomer to addition polymerization in the presence of potassium hydroxide, of which the major portion is dispersed in the polymerization system, in an amount of 2 to 30 % by mole to the alkylene oxide monomer at a temperature of 20° to 100°C. with agitation, and reacting the polymerized alkylene oxide with an allyl halide compound, or by subjecting an alkylene oxide monomer to addition polymerization in the presence of potassium hydroxide, of which the major portion is dispersed in the polymerization system, in an amount of 2 to 30 % by mole to the alkylene oxide monomer at a temperature of 20° to 100°C. with agitation, reacting the polymerized alkylene oxide with an organic polyhalide and then reacting with an allyl halide compound.

In the present invention, it is essential that the amount of potassium hydroxide is 2 to 30 % by mole to the alkylene oxide monomer employed. When the amount is less than 2 % by mole, a hydroxyl end-group formed by chain transfer reaction is not completely converted into an alkoxide group and, therefore, it is impossible to introduce allyl groups to all of the chain ends by treating the polymer solution with the allyl halide compound after the conclusion of the polymerization. According to the present invention, most of the hydroxyl end-groups formed as result of chain transfer reaction in the polymerized alkylene oxide can be converted into alkoxide groups when not less than 2 % by mole of potassium hydroxide is employed and the polymerization condition is properly controlled, and the direct preparation of polyalkylene oxide of which most of the end-groups are allyl group becomes possible by finally treating the polymerized alkylene oxide with the allyl halide compound. The more the amount of potassium hydroxide, the more the conversion of hydroxyl group into alkoxide group becomes sure. Therefore, the polymerization is preferably carried out by employing more than 4 % by mole of potassium hydroxide. It is unnecessary to employ more than 30 % by mole of potassium hydroxide and also is undesirable because a large excess of potassium hydroxide reacts with the allyl halide compound and consumes the allyl halide compound before the polymerized alkylene oxide reacts with the allyl halide compound.

In the present invention, the selection of the polymerization temperature is particularly important. It is necessary to carry out the polymerization under conditions in which a part of potassium hydroxide is dissolved in the polymerization system and the dissolved portion of potassium hydroxide will behave partly as a polymerization catalyst and most of potassium hydroxide is persed in the polymerization system, for instance, at a low temperature, because the concentration of the catalyst becomes very high when all of the potassium hydroxide employed is dissolved in the polymerization system and, as a result, the polymerization rapidly proceeds and the control thereof becomes impossible. However, when the polymerization temperature is extremely low, the polymerization rate becomes slow and a long period is required for the polymerization, which is economically disadvantageous. The polymerization temperature is suitably selected from the range of 20° to 100°C., preferably from the range of 40° to 80°C. At the polymerization temperature over 100°C., most of the potassium hydroxide is dissolved in the polymerization system and behaves as a polymerization catalyst and the control of the polymerization rate and molecular weight becomes difficult. As another demerit due to high temperature, it is pointed out that many propenyl end-group are formed. This propenyl group is very unstable to an acidic water, and is readily hydrolyzed to change into hydroxyl group. When a purification method, for instance, as employing an acidic water is applied at the step of post-treatment for removing potassium hydroxide from the obtained polymer, hydroxyl end-group is formed and, as a result, the proportion of the end-group occupied by allyl group lowers. There are still many unclear points in a formation mechanism of propenyl group. In general, however, it has been observed that the higher the polymerization temperature, the more the propenyl group is formed, and that the allyl group isomerizes to the propenyl group at high temperature in the presence of a basic material such as potassium hydroxide in the polymerization system. Especially, in the present invention employing a fairly large amount of potassium hydroxide, the propenyl group is formed in large quantity at high temperature and it becomes difficult to prepare the polyalkylene oxide of which all of the chain ends are allyl group. Thus, the low polymerization temperature as mentioned before is necessary for the present invention. In comparison with a conventional process for preparing polyalkylene oxide having hydroxyl end-group which employs a high polymerization temperature of 80° to 160°C., especially of more than 100°C., the present invention which employs a low temperature of 20° to 100°C. is very suitable to the preparation of polyalkylene oxide having allyl end-group.

Examples of the alkylene oxide monomer employed in the present invention are ethylene oxide, propylene oxide, isobutylene oxide, 1-butene oxide, 2-methylbutene oxide, and the like. These alkylene oxides may be employed alone or as a mixture thereof. Especially, in that allyl groups can be introduced into the chain-ends even if the chain tranfer reaction occurs, propylene oxide alone or a mixture of propylene oxide and other alkylene oxide is preferably employed.

As mentioned before, a part of potassium hydroxide behaves as a polymerization catalyst. Though potassium hydroxide is, of course, employed alone as a catalyst, a two-component system consisting of potassium hydroxide and an initiator is also employed in the present invention. Since it is possible to control a molecular weight freely and make the polymerization proceed smoothly, the two-component system is preferably employed. Examples of the initiator employed in combination with potassium hydroxide are monohydric alcohol having allyl group such as allyl alcohol or 2-allyloxy ethanol, polyhydric alcohol such as ethylene glycol, diethylene glycol, propylene glycol, dipropylene glycol, polyoxyethylenepolyol having a molecular weight of 150 to 1,000, e.g. polyoxyethylene glycol or polyoxyethylene triol, polyoxypropylenepolyol having a molecular weight of 150 to 1,000, e.g. polyoxypropylene glycol or polyoxypropylene triol, glycerin, 1,2,6-hexanetriol, 1,1,1-trimethylolpropane, pentaerythritol, catechol, resorcinol, triethanolamine, triisopropanolamine or N-methyldiethanolamine, metals of Group Ia of the Periodic Table such as lithium, sodium or potassium, alkoxide compounds of monohydric alcohol having allyl group or polyhydric alcohol and metal of Group Ia of the Periodic Table, and the like. In the present invention, one or more of these initiators are employed in combination with potassium hydroxide. The higher the functionality of the initiator or the less the amount of the initiator, the higher the molecular weight of the produced polyalkylene oxide. For instance, when a trihydric alcohol is employed, the polymerization proceeds forward in three directions. In such a case, the polymer propagating forward in three directions also reacts with a linear polymer having an allyl group at one end-group, which is formed by chain transfer reaction, to give a polymer having more complicated structure. Therefore, polyalkylene oxide having a desired molecular weight can be obtained by selecting the kind and amount of the initiator. When the initiator is employed in excess, the polymerization rate tends to lower and the hydroxyl end-group tends to be formed in the obtained polyalkylene oxide. Usually, the initiator is employed in an amount of not more than 3 % by mole to the alkylene oxide monomer employed.

According to the present invention, the polyalkylene oxide having allyl end-groups is obtained by treating the polymerized alkylene oxide with an allyl halide compound to terminate the polymerization after the conclusion of the polymerization. Further, by treating the polymerized alkylene oxide with an organic polyhalide prior to the treatment with an allyl halide compound and then treating with the allyl halide compound to terminate the polymerization, the polyalkylene oxide having a more increased molecular weight can be obtained. For instance, the reaction in case that methylene chloride is employed as the organic polyhalide is illustrated as follows:

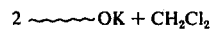

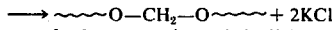  1

As a result the organic polyhalide reacts with the potassium group of the polymerized alkylene oxide, the molecular weight of polyalkylene oxide increases.

In general, there are two cases in the reaction between alkoxide group and an organic halide as illustrated below:

  2.

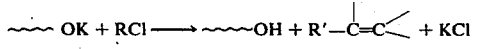  (3)

That is to say, one is the nucleophilic substitution as shown in the formula (2) and another is the olefin formation by the elimination reaction as shown in the formula (3). In order to increase the molecular weight by acting the organic polyhalide to the potassium alkoxide group at the chain end, it is necessary to make occur the replacement reaction corresponding to the formula (2). On the other hand, the reaction as shown in formula (3) has the disadvantage that not only the molecular weight does not increase, but also hydroxyl group is formed at the chain end. Therefore, it is necessary to select the organic polyhalide which does not cause the reaction as shown in the formula (3) as much as possible. In the present invention, there are preferably employed the organic polyhalide having the general formula as follows:

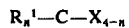 (a)

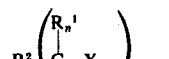 (b)

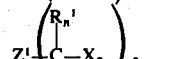 (c)

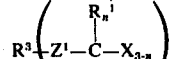 (d)

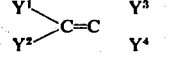 (e)

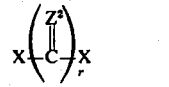 (f)

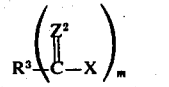 (g)

wherein $n$ is 0 or an integer of 1 to 2, $m$ is an integer of 1 to 4, $r$ is an integer of 1 to 2, $R^1$ is hydrogen or a monovalent aromatic hydrocarbon residue having 1 to 20 carbon atoms which bonds to $-C-X_{4-n}$ or

through a carbon atom having no hydrogen atom, e.g.

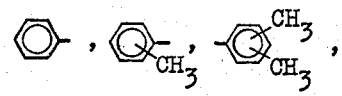

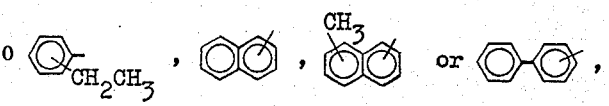

$R^2$ is a m-valent aromatic hydrocarbon residue having 1 to 20 carbon atoms which bonds to

through a carbon atom having no hydrogen atom, e.g.

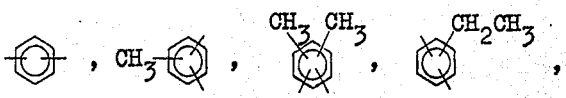

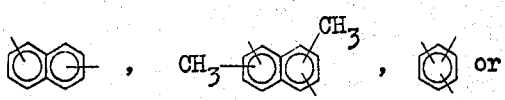

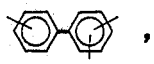

$R^3$ is a m-valent hydrocarbon residue having 1 to 20 carbon atoms, e.g.

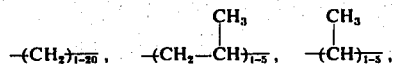

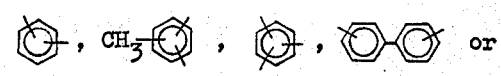 or

$Z^1$ is a bivalent radical selected from the group consisting of —O—, —S—,

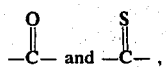

$Z^2$ is oxygen or sulfur, X is halogen, and $Y^1$ to $Y^4$ are radicals selected from the group consisting of halogen and hydrogen and at least two of them are halogen.

Examples of the organic polyhalide employed in the invention are methylene chloride, chloroform, carbon tetrachloride, methylene bromide, methylene iodide, methylene fluoride, benzal chloride, benzal bromide, bis(chloromethyl)benzene, bis(bromomethyl)benzene, tris-(chloromethyl)benzene, 4,4'-bis(chloromethyl)-biphenyl, bis(chloromethyl)naphthalene, bis(dichloromethyl)benzene, bis(chloromethyl) ether, bis(-chloromethyl) thioether, bis(chloromethyl) ketone, bis(chloromethyl)formal, bis(chloromethoxy)benzene, tris(chloromethoxy)benzene, tetrachloroethylene, trichloroethylene, 1,1-dichloroethylene, 1,2-bis(-chloromethoxy)ethane, 1,2-dichloroethylene, 1,2-dibromoethylene, phosgene, oxalyl chloride, adipyl chloride, succinyl chloride, fumaryl chloride, phthalyl chloride, and the like.

The amount of the organic polyhalide is decided in accordance with the desired molecular weight or the functionality of the employed organic polyhalide, but usually selected from the range of 0.10 to 2.0 moles to one mole of the end-group of the polymerized alkylene oxide at the time of the conclusion of the polymerization. In order to obtain the polymer having high molecular weight, the higher the functionality of the organic polyhaide, the better. In addition, since there are cases that the molecular weight reaches a maximum value at certain amount of the organic polyhalide, it is also necessary to employ the orgain polyhalide in a proper amount. That is to say, there are cases in which it is undersirable to employ the organic polyhalide to little or to much. Therefore, it is necessary to select the optimum amount in compliance with the organic polyhalide employed. As a measure for obtaining the highest molecular weight, the organic polyhalide may be employed in an amount of $1/2N$ to $1/N$ mole to one mole of the end-group of the polymerized alkylene oxide at the time of the conclusion of the polymerization, wherein N is halogen number of the organic polyhalide. In the present invention, the organic polyhalide is usually reacted with the polymerized alkylene oxide at a temperature of 0° to 100°C. for 10 minutes to 3 hours.

After the conclusion of the polymerization of alkylene oxide or the treatment with the organic polyhalide, the polyalkylene oxide having allyl end-groups is obtained by treating the reaction mixture with the allyl halide compound such as allyl chloride, allyl bromide, allyl iodide, and the like. Especially, allyl chloride is preferably employed since it si cheap. The amount of the allyl halide compound is not less than one mole to one mole of the end-group of the produced polymer. The reaction temperature is selected from the range of 20° to 100°c. and the reaction period is selected from the range of 10 minutes to 2 hours.

Since the polymerization and the treatment with organic polyhalide or allyl halide compound proceed in the heterogeneous system in which most of potassium hydroxide is dispersed, the polymerization or reaction rate is considerably influenced by a rate of agitation. Accordingly, in order to obtain the desired polymer in good reproducibility and use as little potassium hydroxide as passible, the agitation is carried out so as to make potassium hydroxide disperse uniformly. As a way for making potassium hydroxide disperse uniformly, potassium hydroxide may be pulverized as fine as possible. The finer the employed potassium hydroxide, the smoother the polymerization proceeds and the more the conversion of the hydroxyl end-group into potassium alkoxide group makes secure. Therefore, by employing finely divided potassium hydroxide, the molecular weight can be increased successfully when treated with the organic polyhalide and the allyl groups can be securely introduced to the chain ends of the polymer when finally treated with the allyl halide compound.

As mentioned before, potassium hydroxide plays two important parts one of which is to behave as a polymerization catalyst and another is to convert the hydroxyl end-group formed by the chain transfer reaction during the polymerization into the potassium alkoxide group. Therefore, the polyalkylene oxide having allyl end-groups can be obtained merely by making potassium hydroxide exist in the polymerization system from the start, but in order to make the conversion into potassium alkoxide group more secure, potassium hydroxide may be further added to the polymerization system or the reaction system after the conclusion of the polymerization or the reaction with the organic polyhalide.

The polymerization period depends on the amount of potassium hydroxide, the amount of the initiator such as alcohol, the polymerization temperature, and so on. Usually by carrying out the polymerization for 1 to 40 hours, the polyalkylene oxide can be obtained in a stoichiometric yield. The polymerization may be carried out in a batchwise system or in a continuous system.

According to the present invention, there can be optionally prepared the polyalkylene oxide having a molecular weight within the range of 500 to 10,000 when the polymer solution is treated merely with the allyl halide compound after the conclusion of the polymerization, and also the polyalkylene oxide having a molecular weight within the range of 1,000 to 15,000 when the polymer solution is treated with the organic polyhalide and then treated with the allyl halide compound. The polyalkylene oxide having the desired molecular weight within the above-mentioned range can be obtained mainly by selecting the kind and the amount of the initiator, the polymerization temperature, and the kind and the amount of the organic polyhalide.

The present invention is carried out with or without a solvent since the molecular weight of the prepared polymer is less than 15,000. Especially, the polymerization is preferably carried out in a bulk polymerization system without employing a solvent in view of an economical advantage that the polymerization rate is large and therefore the polymerization is complete in a short period. In case of employing a solvent, there should be employed a solvent which does not inhibit the polymerization and the reaction thereafter. Examples of the solvent employed in the present invention are aromatic hydrocarbons such as toluene, benzene and xylene, aliphatic hydrocarbons such as butane, pentane, hexane, heptane and octane, ethers such as diethyl ether, 1,2-dimethoxyethane and tetrahydrofuran, and the like. Alcohols having an active hydrogen, primary amines, secondary amines and mercaptans are undesirable since they cause the chain transfer reaction during the polymerization, and organic halides are also undesirable since they react with potassium hydroxide and alkoxide group at the chain end of the polymer produced.

The reagents employed in the present invention, namely alkylene oxide monomer, potassium hydroxide, initiator such as alcohol, organic polyhalide, allyl halide compound and solvent are preferably dehydrated as much as possible by drying. When water exists in the polymerization system, it behaves as a factor which causes the chain transfer reaction and therefore the formation of hydroxyl end-group may occur. Moreover, since the conversion reaction of hydroxyl end-group into alkoxide group by potassium hydroxide is the equilibrium reaction, this conversion reaction may also be badly influenced by water. Especially, it is desirable that potassium hydroxide is substantially dehydrated and pulverized as finely as possible. However, it is not absolutely necessary to employ the dehydrated reagents. Even if the reagents not being dehydrated are employed, the polyalkylene oxide having allyl end-groups can be successfully prepared by such a way as increasing the amount of potassium hydroxide.

The thus prepared solution of polyoxyalkylene having allyl end-groups includes metal salts such as potassium hydroxide and potassium chloride and, therefore, they are then removed from the solution and the polymer is purified. The removal of the residual metal salts is carried out by filtration, preferably by applying a conventional way employed in the purification of polyalkylene oxide having hydroxyl end-groups as a starting material for urethane foams or urethane rubbers, for instance, (a) a way of neutralizing the solution with an acid such as sulfuric acid, hydrochloric acid or phosphoric acid and filtering, (b) a way of neutralizing the solution with an acid and removing by centrifugation, (c) a way of dissolving the polymer in an organic solvent immiscible with water, repeating a water-washing, treating with active carbon or activated clay and removing water and solvent under a reduced pressure, (d) a way of dissolving the polymer in an organic solvent, treating with a cation exchange resin and removing the solvent, and (e) a way of neutralizing the solution with a salt such as magnesium silicate or aluminum silicate and filtering with employing diatomaceous earth as a filter aid, but the way for purifying the polymer in the present invention is not intended to be limited to the above-mentioned ways. Since the polymer prepared in accordance with the present invention has fairly high molecular weight and therefore the viscosity of the obtained polymer solution is high, the purification of the polymer is more preferably carried out after making the viscosity lower by adding a solvent to dissolve the polymer such as hydrocarbons, halogenated hydrocarbons, ethers, and the like.

Though the structure of the polyalkylene oxide obtained in accordance with the present invention varies to a small extent with the kind of initiator and organic polyhalide employed, it can be illustrated as follows:

For instance, when the alkylene oxide monomer is polymerized with employing potassium hydroxide alone or with employing potassium hydroxide in combination with the initiator such as allyl alcohol, ethylene glycol, propylene glycol, polyoxyethylene glycol, polyoxypropylene glycol or metallic sodium and then the resulting polymer solution is treated with the allyl halide compound without treating it with the organic polyhalide, there is prepared a polyalkylene oxide having the following general formula:

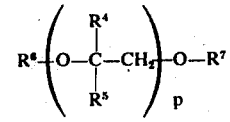

wherein $p$ is an integer of 10 to 170, $R^4$ and $R^5$ are a member selected from the class consisting of hydrogen, methyl group and ethyl group, $R^6$ and $R^7$ are a member selected from the class consisting of hydrogen, allyl group and propenyl group, and 80 to 100 % by mole of the total end-group (total of $R^6$ and $R^7$) in the prepared polymer is allyl group.

Also, when the above-mentioned polymer solution is treated with the organic polyhalide and then treated with the allyl halide compound, there is prepared a polyalkylene oxide having the following general formula:

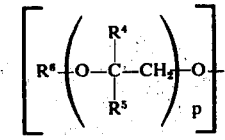

wherein $p$, $R^4$, $R^5$ and $R^6$ are as defined above, $R^8$ is a group derived from the polyfunctional haloorganocompound as shown below, and $q$ is an integer corresponding to the number of the functionality of the organic polyhalide as shown below.

| ORGANIC POLYHALIDE | | $R^8$ | $q$ |
|---|---|---|---|
| $CH_2Cl_2$, $CH_2Br_2$ | | $-CH_2-$ | 2 |
| $ClCH_2OCH_2Cl$, $BrCH_2OCH_2Br$ | | $-CH_2OCH_2-$ | 2 |
| 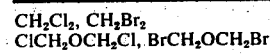 | 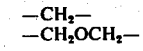 |  | 2 |
|  | 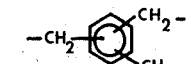 | 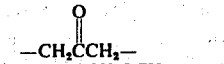 | 3 |
| 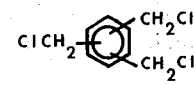 | | | |
| $ClCH_2\overset{O}{\underset{\|}{C}}CH_2Cl$ | | $-CH_2\overset{O}{\underset{\|}{C}}CH_2-$ | 2 |
| $ClCH_2OCH_2OCH_2Cl$ | | $-CH_2OCH_2OCH_2-$ | 2 |
| $ClCH_2OCH_2CH_2OCH_2Cl$ | | $-CH_2OCH_2CH_2OCH_2-$ | 2 |
|  | |  | 2 |

-continued

| ORGANIC POLYHALIDE | R<sup>8</sup> | q |
|---|---|---|

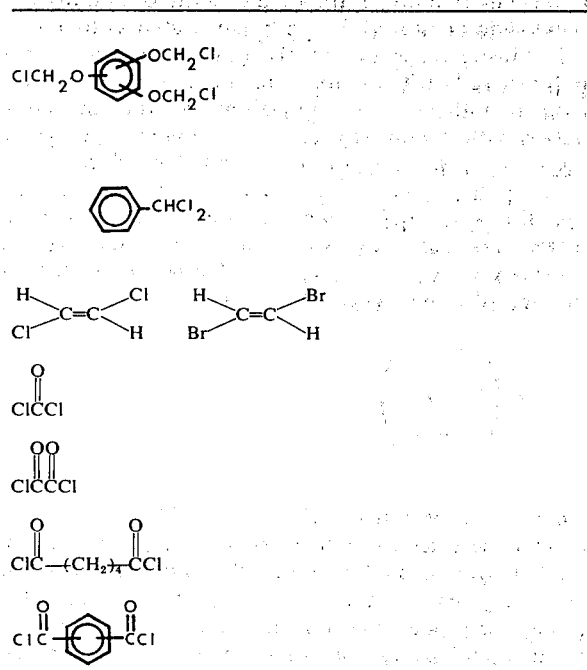
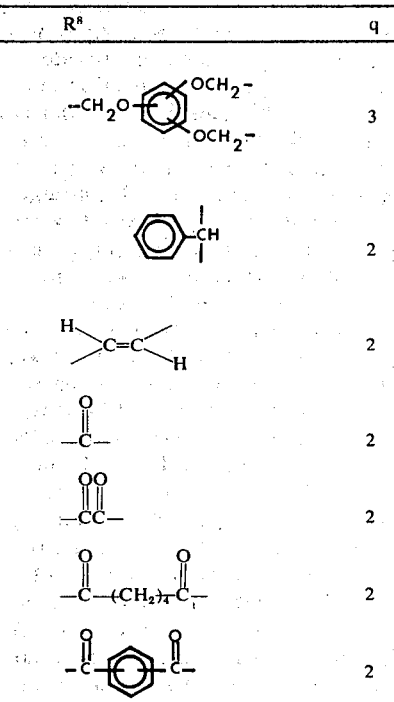

The polyalkylene oxide of the present invention is odorless and has a molecular weight within the range of 500 to 15,000. Also, the physical properties of the polyalkylene oxide are generally as follows:

Viscosity (at 15°C.): 2 to 200,000 cps.
Distribution of molecular weight ($M_w/M_n$): 1.3 to 1.7
Glass transition temperature: −71° to −77°C.
Pyrolysis temperature in a nitrogen atmosphere: 260° to 280°C.

The polyalkylene oxide having allyl end-groups prepared cheaply and easily in accordance with the present invention can be employed as a material for cast rubber, sealant, potting material or coating material by such a way as hardening with a curing agent such as a vulcanization accelerator-sulfur system, or hardening by copolymerizing with another monomer capable of radical-polymerization. Also, the polymer can bring about a plasticization of another polymer by blending with a thermoplastic resin such as polyvinyl chloride or by reacting therewith, and useful as a polymeric plasticizer.

The present invention is more particularly described and explained by means of the following illustrative Examples.

EXAMPLE 1

A potassium hydroxide pellet was pulverized to fine powders in a nitrogen atmosphere, and a 200 ml. pressure-resisting glass reactor equipped with an electromagnetic agitator, in which the air was replaced with nitrogen, was charged with 4.2 g. (75 millimoles) of potassium hydroxide and further charged with 52.3 ml. (750 millimoles) of propylene oxide in a stream of nitrogen at room temperature. After sealing the reactor, the polymerization was carried out at a temperature of 50°C. for 5 hours with agitation at a degree that the potassium hydroxide powders were uniformly dispersed into the polymerization system. Then, the unreacted propylene oxide was removed under a reduced pressure. After lowering the temperature to 30°C., 6.1 ml. (75 millimoles) of allyl chloride was added to the system. The reaction was carried out at a temperature of 60°C. for 30 minutes with agitation, and then potassium hydroxide and potassium chloride were removed by filtration with a glass filter to give 6 g. of a liquid polymer tinged slightly with yellow in a 14 % yield.

The viscosity number of the produced polymer was 0.096 (30°C., toluene solution, concentration = 0.8206 g./dl.) and the average molecular weight was 3,100. Further, the iodine value and the hydroxyl value of the produced polymer were measured and the proportion of the end-group was calculated therefrom. The iodine value and the hydroxyl value were respectively 14.7 and 0.4, and 99 % by mole of the end-group was an olefin group and 1 % by mole of the end-group was the hydroxyl group. As a result of measuring an infrared absorption spectrum, there were observed the characteristic absorption of allyl group at 1,640 cm.$^{-1}$ and the absorption of propenyl group at 1,664 cm.$^{-1}$ However, the absorption intensity of the propenyl group was extremely small as compared with that of the allyl group, and most of the olefin end-group was allyl group.

The polymer was odorless and had the following physical properties.

Viscosity (at 15°C.): 900 cps.
Distribution of molecular weight ($M_w/M_n$): 1.56
Glass transition temperature: −74°C.
Pyrolysis temperature in a nitrogen atmosphere: 268°C.

EXAMPLE 2

The same procedure as in Example 1 was repeated except that 56.0 ml. (800 millimoles) of propylene oxide, 4.5 g. (80 millimoles) of potassium hydroxide, 3.3 ml. (40 millimoles) of allyl chloride, the polymerization period of 25 hours were employed to give 46.5 g. of a liquid polymer tinged slightly with yellow in a 92 % yield.

The viscosity number of the produced polymer was 0.102 (30°C., toluene solution, concentration = 0.8454 g./dl.) and the average molecular weight was 3,400. Also, the iodine value and the hydroxyl value were 14.6 and 0.7 respectively, and 98 % by mole of the end-group was an olefin group and 2 % by mole of the end-group was the hydroxyl group. As a result of measuring an infrared absorption spectrum, there were observed the characteristic absorption of allyl group at 1,640 cm.$^{-1}$ and the absorption of propenyl group at 1,664 cm.$^{-1}$ However, the absorption intensity of the propenyl group was extremely small as compared with that of the allyl group, and most of the olefin end-group was allyl group.

Example 3

The same procedure as in Example 1 was repeated except that 4.5 g. (80 millimoles) of potassium hydroxide, 35.0 ml. (500 millimoles) of propylene oxide, 13.2 g. (300 millimoles) of ethylene oxide were employed and the polymerization was carried out at a temperature of 40°C. for 30 hours and further 4.9 ml. (60 millimoles) of allyl chloride was employed, to give 41.5 g. of a liquid polymer tinged slightly with yellow in a 98 % yield.

The viscosity number of the produced polymer was 0.128 (30°C., toluene solution, concentration = 0.7932 g./dl.) and the average molecular weight of the polymer was about 4,200.

The iodine value and the hydroxyl value of the polymer were respectively 11.7 and 0.8, and 97 % by mole of the end-group was olefin group and 3 % by mole of the end-group was hydroxyl group. Most of the olefin end-group was allyl group, which was observed by infrared absorption spectrum.

Example 4

The same procedure as in Example 1 was repeated except that the amount of potassium hydroxide was 2.1 g. (38 millimoles) and the polymerization period was 30 hours, to give 41.0 g. of a liquid polymer tinged slightly with yellow in a 94 % yield.

The viscosity number of the produced polymer was 0.098 (30°C., toluene solution, concentration = 0.7876 g./dl.) and the average molecular weight was about 3,200.

The iodine value and the hydroxyl value of the polymer were respectively 14.6 and 2.8, and 92 % by mole of the end-group was olefin group and 8 % by mole of the end-group was hydroxyl group. Most of the olefin end-group was allyl group, which was observed by infrared absorption specturm.

Example 5

The same procedure as in Example 1 was repeated except that 2.9 g. (52 millimoles) of potassium hydroxide, 45.5 ml. (650 millimoles) of propylene oxide, the polymerization temperature of 60°C., the polymerization period of 15 hours and 4.2 ml. (52 millimoles) of allyl chloride were employed, to give 34.0 g. of a liquid polymer tinged slightly with yellow in a 90 % yield.

The viscosity number of the produced polymer was 0.085 (30°C., toluene solution, concentration = 0.8621 g./dl.) and the average molecular weight was about 2,800.

The iodine value and the hydroxyl value of the polymer were respectively 16.7 and 3.2, and 92 % by mole of the end-group was olefin group and 8 % by mole of the end-group was hydroxyl group. Most of the olefin end-group was allyl group, which was observed by infrared absorption spectrum.

Example 6

A potassium hydroxide pellet was pulverized to fine powders in a nitrogen atmosphere, and 200 ml. pressure-resisting glass reactor equipped with an electromagnetic agitator, in which the air was replaced with nitrogen, was charged with 5.1 g. (90 millimoles) of the potassium hydroxide powders and further charged with 0.6 ml. (9 millimoles) of allyl alcohol and 63.2 ml. (900 millimoles) of propylene oxide in a stream of nitrogen at room temperature, in order. After sealing the reactor, the polymerization was carried out at a temperature of 50°C. for 5 hours with agitation at a degree that the potassium hydroxide powders were uniformly dispersed into the polymerization system. After removing the unreacted propylene oxide from the system under a reduced pressure, replacing the air with nitrogen and lowering the temperature to 30°C., 7.4 ml. (90 millimoles) of allyl chloride was added to the system. The reaction was carried out at a temperature of 60°C. for 30 minutes with agitation. Then, potassium hydroxide and potassium chloride were removed by filtration with a glass filter to give 40 g. of a viscous liquid polymer tinged slightly with yellow in a 76 % yield.

The viscosity number of the produced polymer was 0.066 (30°C., toluene solution, concentration = 0.8268 g./dl.) and the average molecular weight was about 2,200. Further, the iodine value and the hydroxyl value of the produced polymer were measured and the proportion of the end-group was calculated therefrom. The iodine value and the hydroxyl value were respectively 21.3 and 1.6, and 97 % by mole of the end-group was an olefin group and 3 % by mole of the end-group was hydroxyl group. As a result of measuring an infrared absorption spectrum, there were observed the characteristic absorption of allyl group at 1.640 cm.$^{-1}$ and the characteristic absorption of propenyl group at 1,664 cm.$^{-1}$ However, the absorption intensity of the propenyl group was extremely small as compared with that of the allyl group, and most of the olefin end-group was allyl group.

The polymer was odorless and had the following physical properties.

Viscosity (at 15°C.): 280 cps.
Distribution of molecular weight ($M_w/M_n$): 1.42
Glass transition temperature: −76°C.
Pyrolysis temperature in a nitrogen atmosphere: 264°C.

Example 7

The same procedure as in Example 6 was repeated except that 0.3 ml. (4.5 millimoles) of allyl alcohol was employed instead of 0.6 ml. of allyl alcohol and the polymerization was carried out for 12 hours, to give 51 g. of a viscous liquid polymer tinged slightly with yellow in a 98 % yield.

The viscosity mumber of the produced polymer was 0.090 (30°C., toluene solution, concentration = 0.9100 g./dl.) and the average molecular weight was about 3,100.

The iodine value and the hydroxyl value were respectively 15.2 and 2.6, and therefore 92 % by mole of the end-group was an olefin group and 8 % by mole was hydroxyl group. It was confirmed that most of the olefin end-group was allyl group by the measurement of the infrared absorption spectrum.

Comparative Example 1

A reactor replaced with nitrogen was charged with 0.52 g. (9.3 millimoles) of potassium hydroxide, 0.63 ml. (9.3 millimoles) of allyl alcohol and 64.8 ml. (930 millimoles) of propylene oxide, and the polymerization was carried out at a temperature of 50°C. for 41 hours by the same manner as in Example 6. After removing the unreacted propylene oxide under a reduced pressure, 2.3 ml. (28 millimoles) of allyl chloride was then added and the reaction was carried out at a temperature of 60°C. for 30 minutes with agitation by the same manner as in Example 6, to give 6 g. of a liquid polymer tinged slightly with yellow in a 11 % yield.

The viscosity number of the produced polymer was 0.028 (30°C., toluene solution, concentration = 0.8704 g./dl.) and the average molecular weight was about 800.

The iodine value and the hydroxyl value were respectively 32.1 and 64.0, and 54 % by mole of the end-group was an olefin group and 46 % by mole of the end-group was hydroxyl group. As is clear from the comparison with Example 6, when the amount of potassium hydroxide is small as 1 % by mole to the propylene oxide monomer employed, the polymerization is slow and the obtained polymer has the hydroxyl end-group in large quantity.

Example 8

The same procedure as in Example 6 was repeated except that the amount of allyl chloride was 3.7 ml. (45 millimoles) to give 39 g. of a viscous liquid polymer tinged slightly with yellow in a 74 % yield.

The viscosity number of the produced polymer was 0.064 (30°C., toluene solution, concentration = 0.8622 g./dl.) and the average molecular weight was about 2,100.

The iodine value and the hydroxyl value were respectively 20.1 and 3.2, and 93 % by mole of the end-group was olefin group. It was confirmed that most of the olefin end-group was allyl group by the measurement of the infrared absorption spectrum.

Example 9

The same procedure as in Example 6 was repeated except that 0.3 ml. (4.5 millimoles) of allyl alcohol and 7.8 ml. (90 millimoles) of allyl bromide were employed instead of 0.6 ml. of allyl alcohol and 7.4 of allyl chloride and the polymerization was carried out for 12 hours, to give 52 g. of a viscous liquid polymer tinged slightly with yellow in a 99 % yield.

The viscosity number of the produced polymer was 0.088 (30°C., toluene solution, concentration = 0.8924 g./dl.) and the average molecular weight was about 3,000.

The iodine value and the hydroxyl value were 16.0 and 2.4, respectively. The proportion of the olefin group in the end-group was 93 % by mole and most of the olefin end-group was allyl group.

Example 10

A polymer solution obtained by effecting the polymerization and the reaction in the same manner as Example 6, which included potassium hydroxide and potassium chloride, was diluted with 100 ml. of toluene. After removing a precipitate by filtration, the filtrate was added with 50 ml. of a acidic water by hydrochloric acid and well shaken. The toluene solution of the polymer was separated from the aqueous phase, and therefrom volatile materials were removed by heating at a temperature of 100°C. under a reduced pressure to give 39 g. of a colorless, transparency liquid polymer in a 74 % yield.

The viscosity number of the produced polymer was 0.068 (30°C., toluene solution, concentration = 0.9033 g./dl.) and the average molecular weight was about 2,200.

The iodine value and the hydroxyl value were respectively 19.2 and 5.0, and 89 % by mole of the end-group was olefin group. In the infrared absorption spectrum of the polymer, there was no characteristic absorption of propenyl group at 1,664 cm.$^{-1}$ and all of the olefin end-groups were deemed to be allyl group.

Example 11

A 200 ml. pressure-resisting glass reactor was introduced with nitrogen gas to replace the air, and charged with 5.0 g. (89 millimoles) of finely pulverized potassium hydroxide. Further, the reactor was charged with 0.10 g. (4.4 millimoles) of metallic sodium and 62.2 ml. (890 millimoles) of propylene oxide in a stream of nitrogen at room temperature, in order. After sealing the reactor, the polymerization was carried out at a temperature of 55°C. for 5 hours with agitation at a degree that the potassium hydroxide powders were uniformly dispersed into the polymerization system. After removing the unreacted propylene oxide from the system under a reduced pressure, replacing the air with nitrogen and lowering the temperature to 30°C., 7.3 ml. (89 millimoles) of allyl chloride was added to the system and the reaction was carried out at a temperature of 60°C. for 1 hour. The reaction mixture was diluted with 100 ml. of toluene and filtered by glass filter to remove potassium hydroxide and potassium chloride. Then, the filtered toluene solution of the polymer was heated at a temperature of 100°C. under a reduced pressure to remove volatile materials. Thus, a liquid polymer tinged slightly with yellow was obtained in an amount of 51 g. The yield was 99 %.

The viscosity number of the produced polymer was 0.090 (30°C., toluene solution, concentration = 0.9328 g./dl.) and the average molecular weight was about 3,100.

It was confirmed that 100 % by mole of the end-group in the obtained polymer was olefin group since the iodine value was 16.3 and the hydroxyl value was zero. Most of the end-group of the polymer was allyl group.

Example 12

The same procedure as in Example 11 was repeated except that 0.17 g. (4.4 millimoles) of metallic potassium was employed instead of 0.10 g. (4.4 millimoles) of metallic sodium to give 48 g. of a liquid polymer tinged slightly with yellow in a 93 % yield.

The viscosity number of the produced polymer was 0.096 (30°C., toluene solution, concentration = 0.9184 g./dl.) and the average molecular weight was about 3,300.

The iodine value and the hydroxyl value were respectively 15.8 and 2.6, and the olefin end-group of the polymer calculated therefrom was 93 % by mole. As a result of the measurement of infrared absorption spectrum, most of the oflefin end-group was allyl group.

Example 13

The same procedure as in Example 11 was repeated except that 2.5 g. (44 millimoles) of potassium hydroxide and 3.7 ml. (44 millimoles) of allyl chloride were employed instead of 5.0 g. (89 millimoles) of potassium hydroxide and 7.3 ml. (89 millimoles) of allyl chloride and the polymerization was carried out for 16 hours, to give 46 g. of a liquid polymer tinged slightly with yellow in a 89 % yield.

The viscosity number of the produced polymer was 0.100 (30°C., toluene solution, concentration = 0.8388 g./dl.) and the average molecular weight was about 3,400.

The iodine value and the hydroxyl value were respectively 13.8 and 4.8, and 86 % by mole of the end-group was olefin group. Most of the olefin end-group was allyl group, which was observed by the measurement of infrared absorption spectrum.

Example 14

The same procedure as in Example 11 was repeated except that 0.71 g. (8.9 millimoles) of sodium allyloxide was employed instead of 0.10 g. (4.4 millimoles) of metallic sodium and the polymerization was carried out for 10 hours, to give 51 g. of a liquid polymer tinged slightly with yellow in a 99 % yield.

The viscosity number of the produced polymer was 0.077 (30°C., toluene solution, concentration = 0.8622 g./dl.) and the average molecular weight was about 2,600.

The iodine value and the hydroxyl value of the polymer were 17.6 and 2.6, respectively, and 94 % by mole of the end-group was olefin group. Most of the olefin end-group was allyl group, which was observed by the measurement of infrared absorption spectrum.

Example 15

The same procedure as in Example 6 was repeated except that 30 ml. of tetrahydrofuran was further added to the polymerization system and the polymerization was carried out at a temperature of 65°C. for 12 hours, to give 52 g. of a liquid polymer tinged slightly with yellow in a 99 % yield.

The viscosity number of the produced polymer was 0.060 (30°C., toluene solution, concentration = 0.9652 g./dl.) and the average molecular weight was about 2,000.

The iodine value and the hydroxyl value of the polymer were 19.0 and 6.8, respectively, and 86 % by mole of the end-group was olefin group. Most of the olefin end-group was allyl group, which was observed by the measurement of infrared absorption spectrum.

Example 16

The same procedure as in Example 11 was repeated except that 0.36 g. (1.8 millimoles) of polyoxyethylene glycol having a molecular weight of 200 was employed instead of 0.10 g. of metallic sodium and the polymerization was carried out at a temperature of 45°C. for 20 hours, to give 50.7 g. of a liquid polymer tinged slightly with yellow in a 98 % of yield.

The viscosity number of the produced polymer was 0.126 (30°C., toluene solution, concentration = 0.8072 g./dl.) and the average molecular weight was about 4,200.

The iodine value and the hydroxyl value of the polymer were 11.5 and 1.3 respectively, and 95 % by mole of the end-group was olefin group and 5 % by mole of the end-group was hydroxyl group. Most of the olefin group was allyl group, which was observed by infrared absorption spectrum.

Example 17

The same procedure as in Example 11 was repeated except that 0.52 g. (1.3 millimoles) of polyoxypropylene triol having a molecular weight of 400 was employed instead of 0.10 g. of metallic sodium and the polymerization was carried out at a temperature of 45°C. for 20 hours, to give 50.7 g. of a liquid polymer tinged slignty with yellow in a 98 % yield.

The viscosity number of the produced polymer was 0.144 (30°C., toluene solution, concentration = 0.7826 g./dl.) and the average molecular weight was about 4,800.

The iodine value and the hydroxyl value of the polymer were respectively 10.6 and 0.7, and 97 % by mole of the end-group was olefin group and 3 % by mole of the end-group was hydroxyl group. Most of the olefin end-group was allyl group, which was observed by infrared absorption spectrum.

Example 18

A potassium hydroxide pellet was pulverized to fine powders in a nitrogen atmospher, and a 1.5 liter pressure-resisting glass reactor equipped with an electromagnetic agitator, in which the air was previously replaced with nitrogen, was charged with 50.5 g. (900 millimoles) of the powder. Further in a stream of nitrogen at a room temperature, the reactor was charged with 630 ml. (9.0 moles) of propylene oxide and sealed. Then, the polymerization was carried out at a temperature of 50°C. for 25 hours with agitation. After removing the unreacted propylene oxide from the polymerization system under a reduced pressure, replacing the air with nitrogen and lowering the temperature to 30°C., 8.9 ml. (140 millimoles) of methylene chloride was added to the system and the reaction was carried out at a temperature of 50°C. for 3 hours. Successively, 40.7 ml. (500 millimoles) of allyl chloride was added and the reaction was further carried out at a temperature of 60°C. for 2 hours. Thus obtained polymer solution was filtered to remove potassium hydroxide and potassium chloride, and from the filtrate volatile materials were removed by heating under a reduced pressure to give 481 g. of a viscous liquid polymer tinged slightly with yellow in a 92 % yield.

The average molecular weight of the produced polymer was about 5,800. Further, the iodine value and the hydroxyl value of the polymer were measured and the proportion of the end-group was calculated therefrom. The olefin end-group was 96 % by mole and the hydroxyl end-group was 4 % by mole. Most of the olefin end-group was allyl group, which was observed by the measurement of infrared absorption spectrum.

Example 19

The same procedure as in Example 18 was repeated except that 14.0 g. (80 millimoles) of bis(dichloromethyl) benzene was employed instead of methylene chloride to give 485 g. of a viscous liquid polymer tinged slightly with yellow in a 93 % yield.

The average molecular weight of the produced polymer was about 5,600, and the olefin end-group and the hydroxyl end-group of the polymer were 92 % by mole and 8 % by mole, respectively. Most of the olefin end-group was allyl group, which was observed by infrared absorption spectrum.

Example 20

A potassium hydroxide pellet was pulverized to fine powders in a nitrogen atmosphere, and a 1.5 liter pressure-resisting glass reactor equipped with an electromagnetic agitator, in which the air was previously replaced with nitrogen, was charged with 52.7 g. (0.94 mole) of the powder. Further, in a stream of nitrogen at room temperature, the reactor was charged with 150 ml. of toluene, 1.3 ml. (19 millimoles) of allyl alcohol and 657 ml. (9.39 moles) of propylene oxide, and sealed. Then, the polymerization was carried out at a temperature of 45°C. for 20 hours with agitation. After removing the unreacted propylene oxide from the reaction mixture under a reduced pressure, replacing the air with nitrogen and lowering the temperature to 30°C., 3.7 ml. (39 millimoles) of bis(chloromethyl) ether was added to the mixture in a stream of nitrogen and the reaction was carried out at a temperature of 50°C. for one hour. Successively, 31.8 ml. (0.39 mole) of allyl chloride was added and the reaction was further carried out at a temperature of 60°C. for 1 hour. Thus obtained polymer solution was filtered to remove potassium hydroxide and potassium chloride, and from the filtrate volatile materials were removed by heating under a reduced pressure to give 524 g. of a viscous liquid polymer tinged slightly with yellow in a 96 % yield.

The average molecular weight of the produced polymer was about 5,000. Further, the iodine value and the hydroxyl value of the polymer were measured and the proportion of the end-group was calculated therefrom. The olefin end-group was 86 % by mole and the hydroxyl end-group was 14 % by mole. Most of the olefin end-group was allyl group, which was observed by the measurement of infrared absorption spectrum.

The same polymerization as the above was carried out and the obtained polymer solution was treated with allyl chloride without treating with bis(chloromethyl) ether. The average molecular weight of the obtained polymer was about 3,600.

Example 21

A potassium hydroxide pellet was pulverized to fine powders in a nitrogen atmosphere, and a 200 ml. pressure-resisting glass reactor equipped with an electromagnetic agitator, in which the air was previously replaced with nitrogen, was charged with 4.5 g. (80 millimoles) of the powder. Further, in a stream of nitrogen at room temperature, the reactor was charged with 0.07 ml. (1.2 millimoles) of ethylene glycol and 56.6 ml. (0.81 millimole) of propylene oxide, and sealed. Then, the polymerization was carried out at a temperature of 45°C. for 20 hours with agitation. After removing the unreacted propylene oxide under a reduced pressure, replacing the air with nitrogen and lowering the temperature to 30°C., 30 ml. of toluene was added to the reaction mixture in a stream of nitrogen to dissolve the polymer and further added with 0.46 ml. (6.7 millimoles) of bis(chloromethyl) ether. The reaction was carried out at a temperature of 40°C. for 1 hour. Successively, 2.9 ml. (35 millimoles) of allyl chloride was added to the reaction mixture and the reaction was further carried out at a temperature of 60°C. for 1 hour. Thus obtained polymer solution was filtered to remove potassium hydroxide and potassium chloride, and from the filtrate volatile materials were removed by heating under a reduced pressure to give 46 g. of a viscous liquid polymer tinged slightly with yellow in a 98 % yield.

The average molecular weight of the produced polymer was about 5,700. As a result of the measurement of the iodine value and the hdyroxyl value of the polymer, 85 % by mole of the end-group was olefin group and 15 % by mole of the end-group was hydroxyl group. Most of the olefin end-group was allyl group and the propenyl end-group was very little.

The polymer was odorless and had the following physical properties.

Viscosity (at 15°C.): 7,600 cps.
Distribution of molecular weight ($M_w/M_n$): 1.54
Glass transition temperature: −74°C.
Pyrolysis temperature in a nitrogen atmosphere: 272°C.

The same polymerization as the above was carried out and the obtained polymer solution was treated with allyl chloride without treating with bis(chloromethyl) ether. The average molecular weight of the obtained polymer was about 4,000.

Example 22

The same procedure as in Example 21 was repeated except that the amount of bis(chloromethyl) ether was 0.92 ml. (13.4 millimoles).

The average molecular weight of the produced polymer was about 6,400. As a result of the measurement of the iodine value of the polymer, 82 % by mole of the end-group was olefin group and 18 % by mole of the end-group was hydroxyl group. Most of the olefin end-group was allyl group and the propenyl end-group was very little, which were observed by the measurement of infrared absorption spectrum.

Example 23

The same procedure as in Example 21 was repeated except that 0.43 ml. (6.7 millimoles) of methylene chloride was employed instead of bis(chloromethyl) ether.

The average molecular weight of the produced polymer was about 6,400, and the olefin end-group and hydroxyl end-group of the polymer were 91 % by mole and 9 % by mole, respectively. Most of the olefin end-group was allyl group, which were observed by infrared absorption spectrum.

Example 24

A potassium hydroxide pellet was pulverized to fine powders in a nitrogen atmospher, and 1.5 liter pressure-resisting glass reactor equipped with an electromagnetic agitator, in which the air was previously replaced with nitrogen, was charged with 67.8 g. (1.21 moles) of the powder. Further in a stream of nitrogen at room temperature, the reactor was charged with 4.1 ml. (24 millimoles) of polyethylene glycol having a molecular weight of 200 and 845 ml. (12.08 moles) of propylene oxide, and sealed. Then, the polymerization was carried out at a temperature of 45°C. for 16 hours. After removing the unreacted propylene oxide under a reduced pressure, replacing the air with nitrogen and lowering the temperature to 30°C., 550 ml. of n-hexane was added to the reaction mixture in a stream of nitrogen to dissolve the polymer and further added with 5.3 ml. (83 millimoles) of methylene chloride. The reaction was carried out at a temperature of 50°C. for 2 hours. Successively, after treating the reaction mixture with 13.5 g. (0.24 mole) of powdery potassium hydroxide at a temperature of 50°C. for 1 hour, 39.2 ml. (0.48 mole) of allyl chloride was added and the reaction was further carried out at a temperature of 60°C. for 1 hour. Thus obtained polymer solution was filtered to remove potassium hydroxide and potassium chloride. Then, the filtrate was added with 20 g. of aluminum silicate and treated at a temperature of 20°C. for 1 hour with agitation. Thus treated solution was filtered with employing diatomaceous earth as a filter aid, and from the filtrate volatile materials were removed by heating under a reduced pressure to give 645 g. of a colorless, transparent, viscous liquid polymer in a 92 % yield.

The average molecular weight of the produced polymer was about 6,800, and the olefin end-group and the hydroxyl end-group were 95 % by mole and 5 % by mole, respectively. Most of the olefin end-group was Viscosity (at 15°C.): 13,000
Distribution of molecular weight ($M_w/M_n$): 1.62
Glass transition temperature: −72°C.
Pyrolysis temperature in a nitrogen atmosphere: 271°C.

Example 25

The polymerization was carried out with employing 26.9 g. (0.48 mole) of potassium hydroxide, 420 ml. (6.0 moles) of propylene oxide, 88.1 g. (2.0 moles) of ethylene oxide and 1.6 g. (12 millimoles) of 1,1,1-trimethylol propane in a similar manner as in Example 21. Further, the treatment with 6.4 ml. (100 millimoles) of dichloromethane and the treatment with 24.4 ml. (0.30 mole) of allyl chloride were carried out at a temperature of 50°C. for 3 hours and at a temperature of 60°C. for 2 hours, respectively, in order.

The amount of the produced polymer was 427 g. and the yield was 98 %. The polymer had an average molecular weight of about 6,800, and the olefin end-group and the hydroxyl end-group were 94 % by mole and 6 % by mole, respectively. Most of the olefin end-group was allyl group.

Examples 26 to 36

The same procedures as in Example 21 were repeated except that the organic polyhalide as shown in Table 1 were respectively employed instead of bis(chloromethyl) ether.

The results are shown in Table 1.

Table 1

| Example No. | Polyfunctional halo-organocompound Kind | Amount m.mole | Reaction condition Temp. °C. | Period hour | Polymer product Molecular weight | Olefin end-group mole % |
|---|---|---|---|---|---|---|
| 26 | $CHCl_3$ | 4.8 | 50 | 1 | 5,500 | 78 |
| 27 | $C_6H_5\text{-}CHCl_2$ | 6.7 | 40 | 1 | 5,400 | 82 |
| 28 | $ClCH_2\text{-}C_6H_4\text{-}CH_2Cl$ | 6.7 | 50 | 1 | 6,000 | 88 |
| 29 | $CH_2Br_2$ | 6.7 | 50 | 1 | 6,300 | 88 |
| 30 | $ClCH_2SCH_2Cl$ | 6.7 | 50 | 1 | 5,900 | 86 |
| 31 | $ClCH_2O\text{-}C_6H_4\text{-}(OCH_2Cl)_2$ | 4.8 | 40 | 1 | 8,100 | 85 |
| 32 | $ClCH_2OCH_2OCH_2Cl$ | 6.7 | 50 | 1 | 6,000 | 86 |
| 33 | $ClCH_2\overset{O}{\overset{\|}{C}}CH_2Cl$ | 6.7 | 50 | 1 | 5,700 | 84 |
| 34 | $ClCH{=}CHCl$ | 6.7 | 60 | 1 | 5,000 | 90 |
| 35 | $ClCH{=}CCl_2$ | 4.8 | 60 | 1 | 5,600 | 88 |
| 36 | $Cl\overset{O}{\overset{\|}{C}}Cl$ | 6.7 | 40 | 1 | 6,200 | 86 | allyl group and the propenyl end-group was very little, which were observed by infrared absorption spectrum.

The polymer was colorless and odorless, and had the following physical properties.

What we claim is:

1. A process for preparing a polyoxyalkylene oxide having allyl end-groups which comprises subjecting an alkylene oxide monomer to addition polymerization in the presence of potassium hydroxide in an amount of 2 to 30% by mole to said alkylene oxide monomer at a polymerization temperature of 20° to 100°C. for 1 to 40 hours with agitation, and reacting the polymerized alkylene oxide with an allyl halide compound in an amount of not less than one mole to one mole of an end-group of the polymerized alkylene oxide at a reaction temperature of 20° to 100°C. for 10 minutes to 2 hours; said potassium hydroxide being for the most part dispersed in the polymerization system.

2. The process of claim 1, in which an organic halide is reacted with the polymerized alkylene oxide at a temperature of 0° to 100°C. for 10 minutes to 3 hours prior to reacting the polymerized alkylene oxide with the allyl halide compound; said organic polyhalide being employed in an amount of 0.10 to 2.0 mole to one mole of an end group of said polymerized alkylene oxide.

3. The process of claim 1, in which said potassium hydroxide is employed in combination with at least one initiator selected from the group consisting of monohydric alcohols having allyl group, polyhydric alcohols, metals of Group Ia of the Periodic Table, and alkoxide compounds of a monohydric alcohol having an allyl group or a polyhydric alcohol and a metal of group Ia of the Periodic Table; said initiator being employed in an amount of not more than 3 % by mole to the alkylene oxide monomer.

4. The process of claim 3, wherein said initiator is allyl alcohol, ethylene glycol, diethylene glycol, propylene glycol, dipropylene glycol, 1,1,1-trimethylolpropane, glycerin, polyoxyethylene glycol having a molecular weight of 150 to 1,000, polyoxyethylene triol having a molecular weight of 150 to 1,000, polyoxypropylene glycol having a molecular weight of 150 to 1,000, polyoxypropylene triol having a molecular weight of 150 to 1,000 and metallic sodium.

5. The process of claim 1, wherein the amount of said potassium hydroxide is selected from the range of 4 to 30 % by mole to the alkylene oxide monomer.

6. The process of claim 1, wherein said polymerization temperature is selected from the range of 40° to 80°C.

7. The process of claim 1, wherein said alkylene oxide monomer is at least one member selected from the group consisting of ethylene oxide, propylene oxide, isobutylene oxide, 1-butene oxide and 2-methylbutene oxide.

8. The process of claim 1, wherein said alkylene oxide is propylene oxide.

9. The process of claim 1, wherein said alkylene oxide is a mixture of propylene oxide and an alkylene oxide selected from the group consisting of ethylene oxide, isobutylene oxice, 1-butene oxide and 2-methylbutene oxide.

10. The process of claim 2, wherein said organic polyhalide is at least one having the following formula:

$$R_n^1-C-X_{4-n} \qquad (a)$$

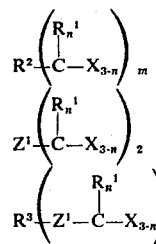

wherein $n$ is 0 or an integer of 1 to 2, $m$ is an integer of 1 to 4, $r$ is an integer of 1 to 2, $R^1$ is hydrogen or a monovalent aromatic hydrocarbon residue having 1 to 20 carbon atoms which bonds to $-C-X_{4-n}$ or $C-X_{3-n}$ through a carbon atom having no hydrogen atom, $R^2$ is a m-valent aromatic hydrocarbon residue having 1 to 20 carbon atoms which bonds to $$-\overset{R_n^1}{\underset{|}{C}}-X_{3-n}$$

through a carbon atom having no hydrogen atom, $R^3$ is a m-valent hydrocarbon residue having 1 to 20 carbon atoms, $Z^1$ is a bivalent radical selected from the group consisting of $-O-$, $-S-$, $$-\overset{O}{\underset{\|}{C}}- \text{ and } -\overset{S}{\underset{\|}{C}}-,$$

$Z^2$ is oxygen or sulfur, $X$ is halogen, and $Y^1$ to $Y^4$ are radicals selected from the group consisting of halogen and hydrogen and at least two of them are halogen.

11. The process of claim 2, wherein said organic polyhalide is at least one member selected from the group consisting of methylene chloride, methylene bromide, chloroform, benzal chloride, bis(chloromethyl) benzene, bis(bromomethyl) benzene, tris(chloromethyl) benzene, bis(chloromethyl) ether, bis(chloromethyl) ketone, bis(chloromethyl) formal, bis(chloromethoxy) benzene, tris(chloromethoxy) benzene, 1,2-bis(chloromethoxy ethane, 1,2-dichloroethylene, 1,2-dibromeethylene, phosgene, oxalyl chloride, adipyl chloride and phthalyl chloride.

12. The process of claim 1, wherein said allyl halide compound is allyl chloride.

13. The process of claim 1, wherein said potassium hydroxide is finely pulverized.

14. The process of claim 1, wherein said potassium hydroxide and alkylene oxide are dehydrated.

15. The process of claim 1, wherein said polymerization is carried out by means of bulk polymerization.

16. The process of claim 1, in which prior to the reaction with the allyl halide compound said polymerization system is added with a solvent selected from the group consisting of aromatic hydrocarbons, aliphatic hydrocarbons and ethers.

17. The process of claim 2, in which prior to the reaction with the organic polyhalide said polymerization system is added with a solvent selected from the group consisting of aromatic hydrocarbons, aliphatic hydrocarbons and ethers.

18. The process of claim 1, in which said polymerized alkylene oxide treated with the allyl halide compound is further subjected to purification.

19. The process of claim 18, wherein said purification comprises neutralizing the resulting reaction mixture after the reaction with the allyl halide compound with a salt selected from the group consisting of magnesium silicate and aluminum silicate, and filtering with employing diatomaceous earth as a filter aid.

20. A polyalkylene oxide having allyl end-groups obtained by the process of claim 1.

21. A polyalkylene oxide having allyl end-groups obtained by the process of claim 2.

22. A polyalkylene oxide having allyl end-groups obtained by the process of claim 3.

23. The process of claim 1, in which said potassium hydroxide is employed in combination with at least one initiator selected from the group consisting of monohydric alcohols having allyl group. polyhydric alcohols, metals of Group Ia of the Periodic Table, and alkoxide compounds of a monohydric alcohol having allyl group or a polyhydric alcohol and a metal of Group Ia of the Periodic Table, and an organic polyhalide is reacted with the polymerized alkylene oxide at a temperature of 0° to 100°C. for 10 minutes to 3 hours prior to reacting the polymerized alkylene oxide with the allyl halide compound; said initiator being employed in an amount of not more than 3% by mole to the alkylene oxide monomer and said organic polyhalide being employed in an amount of 0.10 to 2.0 mole to one mole of an end-group of said polymerized alkylene oxide.

* * * * *